Figure 1:
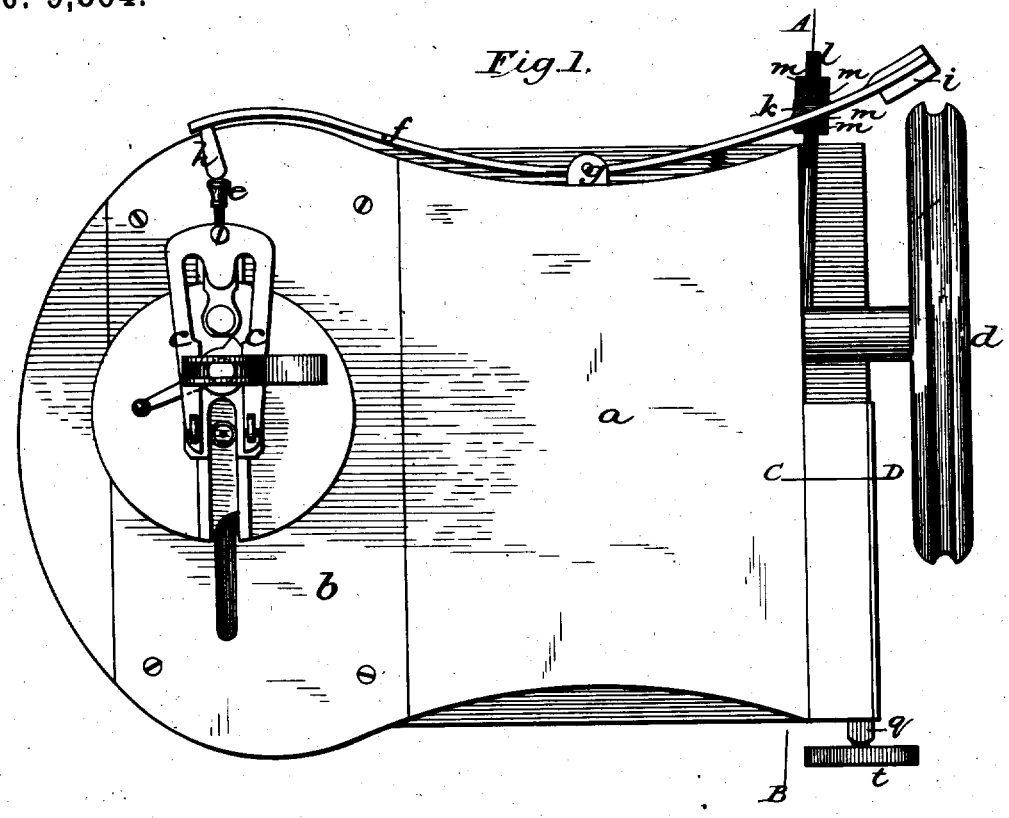

J. J. SULLIVAN.

STOP MOTION ATTACHMENT FOR BUTTON HOLE SEWING MACHINES.

No. 9,864. Reissued Sept. 6, 1881.

Witnesses.

Sidney P. Hollingsworth

Walter S. Dodge

Inventor.

J. J. Sullivan.

By P. T. Dodge

Atty.

J. J. SULLIVAN.

STOP MOTION ATTACHMENT FOR BUTTON HOLE SEWING MACHINES.

No. 9,864. Reissued Sept. 6, 1881.

Witnesses.

Sidney P. Hollingsworth.

Walter S. Dodge

Inventor.

J. J. Sullivan

By P. T. Dodge

Atty.

UNITED STATES PATENT OFFICE.

JOHN J. SULLIVAN, OF IPSWICH, MASSACHUSETTS.

STOP-MOTION ATTACHMENT FOR BUTTON-HOLE SEWING-MACHINES.

SPECIFICATION forming part of Reissued Letters Patent No. 9,864, dated September 6, 1881.

Original No. 179,232, dated June 27, 1876. Application for reissue filed June 16, 1881.

*To all whom it may concern:*

Be it known that I, JOHN J. SULLIVAN, of Ipswich, in the county of Essex and State of Massachusetts, have invented certain new and useful Improvements in Automatic Stop-Motions for Button-Hole Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention consists in combining with a button-hole sewing-machine an automatic device to stop the machine as soon as each button-hole is finished, thus saving much costly labor as compared with the running of ordinary machines having no automatic stop.

My automatic stop-motion, as shown in the drawings, consists of an adjustable projection on the clamps for holding the material, in combination with a lever movable on a fulcrum, which lever is provided at its rear end with a brake that acts upon the driving-wheel of the machine and stops it as soon as the aforesaid projection strikes against the forward end of said lever, when the button-hole is supposed to be finished. Immediately after the brake aforesaid has touched the driving-wheel a rod attached to the brake-lever, and having a wedge or incline in its other end, acts upon a small lever movable around a fulcrum, by which the said small lever is released from a groove in the shipper-bar, in which it was resting. The shipper-bar in moving laterally operates a bent lever around its fulcrum, the lower end of which is connected to the treadle or other shipper device that is used by means of a cord, chain, rod, or other suitable connection.

Figure 2:
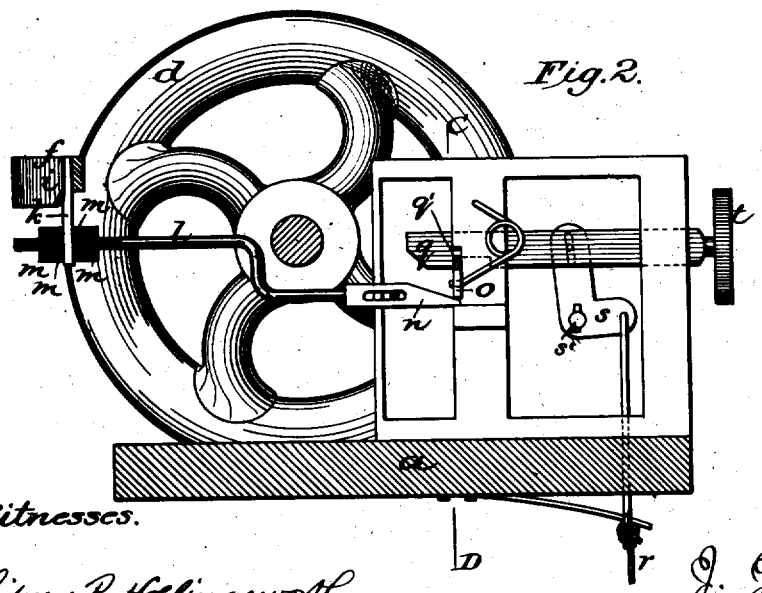
Figure 3:
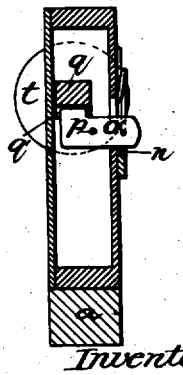
Figure 4:
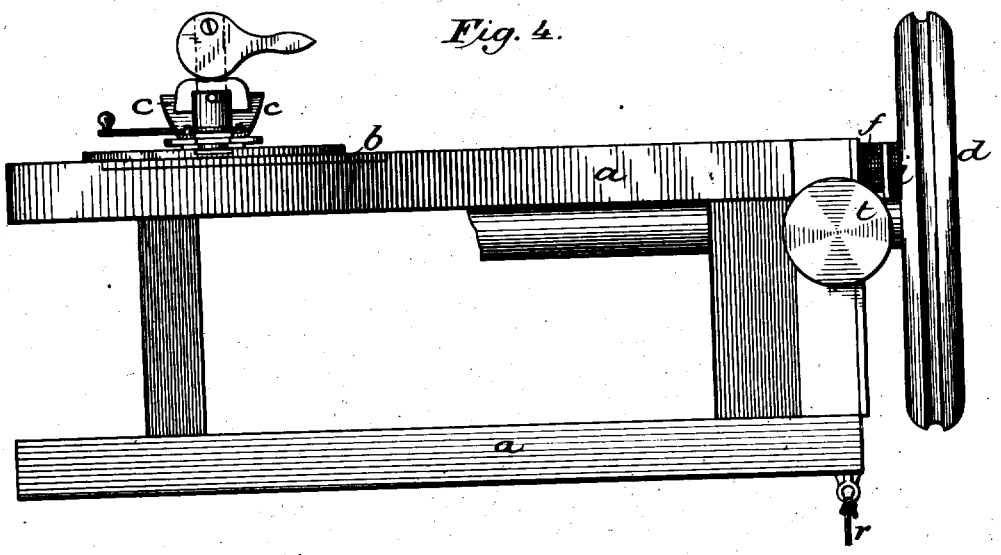
Figure 5:
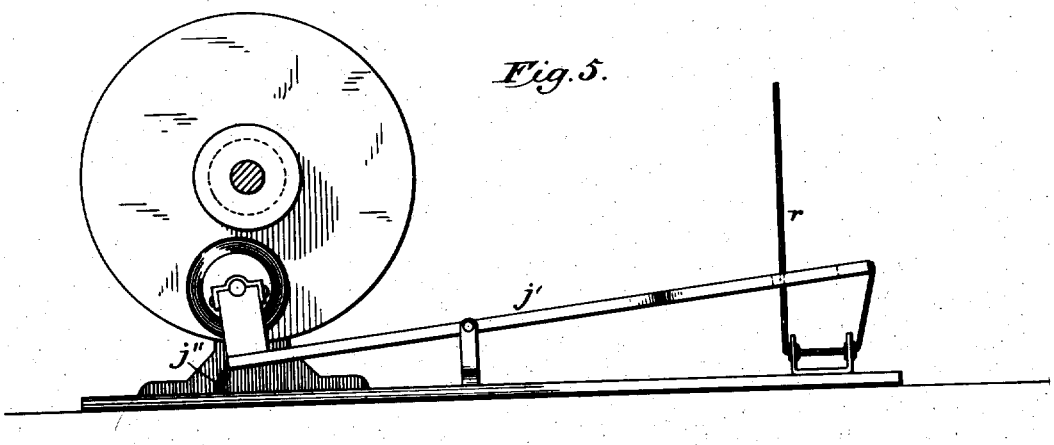
Figure 6:
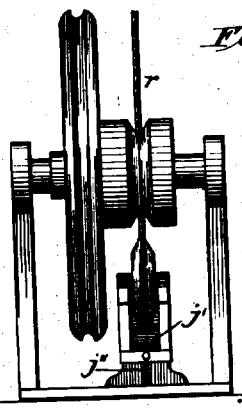

Figure 1 represents a top-plan view of the bed of the machine. Fig. 2 represents a vertical cross-section on the line A B, Fig. 1, looking toward the driving-wheel. Fig. 3 represents a vertical section on the line C D, Figs. 1 and 2. Fig. 4 represents a front elevation of the bed-plate and attachments. Fig. 5 represents a side elevation of the driving-gear and its controlling-treadle, by which motion is communicated to the machine. Fig. 6 is a rear elevation of the same.

Similar letters refer to similar parts wherever they occur on the different parts of the drawings.

*a* represents the frame of an ordinary button-hole machine, of which *b* is the work-plate.

*c c* are the movable clamps for holding and feeding the work around the needle in the usual manner, and *d* is the driving or balance wheel, arranged in the ordinary way. The rear of the clamps *c c* is provided with an adjustable projection, *e*, that can be adjusted to and from the clamps *c c*, as may be desired.

*f* is the rocking lever, movable on the fulcrum *g*, and provided in its forward end with a projection, *h*, that is operated by the projection *e* on the clamp *c c*, for the purpose of automatically stopping the machine as soon as each button-hole is finished. The lever *f* is provided with a brake, *i*, in its rear end, that is pressed against the balance-wheel *d* when the projection *e* strikes the projection *h* on the lever *f*. The rear of said lever *f* has attached to it a downward-projecting piece, *k*, having a hole in its lower end through which the screw-threaded rod *l* projects, having adjustable nuts *m m m m*, by which its proper position in relation to the lever *f* can easily be arranged. The screw-threaded rod *l* is provided in its opposite end with a wedge or incline, *n*, that acts upon the outer end of a small rocking lever, *o*, that is movable on the fulcrum *p*, as shown in Fig. 3. The inner end of the small lever *o* rests in a groove, *q'*, on the shipper-bar *q*, when the button-hole machine is in operation; but as soon as the projection *e* on the clamps *c c* strikes the projection *h* on the lever *f*, or immediately after such contact has taken place, the shipper-bar *q* is released from the small lever *o* by the screw-threaded rod *l* and its wedge *n*, moving forward by means of lever *f*, with its brake *i* acting on the balance-wheel *d*. As soon as the shipper-bar *q* is released it will be moved to its proper place by the spring *j''*, attached to the treadle *j'*, acting through the cord or chain *r*, as shown in Fig. 5, the upper end of which is jointed or connected to the knee-lever *s*, movable on the fulcrum *s'*, and provided in its upper end with a slot fitting over a pin on the shipper-bar *q*, as shown in dotted lines in Fig. 2.

*t* is a handle on the outer end of the shipper-bar $q$, by which the latter can be set in operation.

The drawings represent the respective positions of the various parts when the machine is in running order; but as soon as the clamps $c$ $c$ commence to move to the rear, corresponding to the finish of the button-hole that is made, the projection $e$ on the clamps $c$ $c$ operates the lever $f$ on its fulcrum $g$, and in so doing not only brakes on the balance-wheel $d$, but also automatically operates the shipper-bar $q$ and its connecting mechanism to the treadle, and in this manner stops the machine automatically as soon as each button-hole is finished.

It will be seen that, owing to the adjustability of the device $e$, through which the driving devices are disconnected, the machine is capable of forming button-holes of different lengths or sizes, and of being automatically stopped at the completion of each hole, regardless of its length. When the device is turned or screwed outward away from the clamp, it causes the driving mechanism to be thrown out of action at an earlier period, and thereby causes the machine to stitch a shorter button-hole than when the device E is screwed inward near the clamp.

To start the machine all that is necessary to do is to place the clamps $c$ $c$ and the work resting between them in their proper positions in the ordinary way, and to push the handle $t$ of the shipper-bar $q$ toward the machine to the position shown in Fig. 2, when the knee-lever $s$ is turned on its fulcrum $s'$, and thereby operates the connection $r$ and the ordinary treadle mechanism.

I am not aware that anyone has hitherto provided a button-hole machine with means for automatically stopping the same at the completion of the button-hole.

What I wish to secure by Letters Patent, and claim, is—

1. In combination with the clamps $c$ $c$ of a button-hole machine, the projection $e$, lever $f$, brake $i$, and driving or balance wheel $d$, as and for the purpose set forth and described.

2. In combination, the clamps $c$ $c$, lever $f$, rod $l$, wedge $n$, lever $o$, shipper $q$ $t$, the knee-lever $s$, and link or connection $r$ to the treadle mechanism, substantially as and for the purpose set forth and described.

3. In combination with a button-hole sewing-machine, the driving-gear and devices attached to the machine for automatically stopping the same at the completion of the button-hole, substantially as described.

4. The combination of a button-hole sewing-machine, driving-gear therefor, and an adjustable automatic device, substantially as described, whereby the disconnection of the driving-gear is automatically effected at the completion of each button-hole, and the machine adapted for sewing the holes of different lengths.

5. In a button-hole sewing-machine, the combination of the movable cloth-carrying clamp, driving-gear, and the means for disconnecting the gear operated by the clamp, substantially as described, whereby the automatic stoppage of the machine is effected.

6. In combination with a button-hole sewing-machine, a disconnecting driving-gear, a brake for stopping the motion of the machine, and a device upon the machine which automatically operates both the brake and the disconnecting devices at the completion of each button-hole.

In testimony whereof I affix my signature in presence of two witnesses.

JOHN J. SULLIVAN.

Witnesses:
L. C. YOUNG,
WM. M. SMITH.